US005550176A

United States Patent [19]
Lewis et al.

[11] Patent Number: 5,550,176
[45] Date of Patent: Aug. 27, 1996

[54] ROOM TEMPERATURE SETTING CARBONACEOUS CEMENT WITH INCREASED ELECTRICAL CONDUCTIVITY AND FLEXURAL STRENGTH

[75] Inventors: Irwin C. Lewis, Strongsville; Terrence A. Pirro, Cleveland; Ronald A. Greinke, Medina; Richard I. Bretz; Dennis J. Kampe, both of Parma, all of Ohio

[73] Assignee: UCAR Carbon Technology Corporation, Danbury, Conn.

[21] Appl. No.: 409,896

[22] Filed: Mar. 23, 1995

Related U.S. Application Data

[63] Continuation of Ser. No. 135,154, Oct. 12, 1993, abandoned, which is a continuation-in-part of Ser. No. 870,314, Apr. 17, 1992, Pat. No. 5,280,063.

[30] Foreign Application Priority Data

Apr. 17, 1993 [DE] Germany ........................... 43 12 571.9
Apr. 17, 1993 [JP] Japan ..................................... 5-087247

[51] Int. Cl.$^6$ ....................................................... C08K 3/00
[52] U.S. Cl. ............................... 524/6; 524/440; 524/593; 524/611

[58] Field of Search ................................. 524/6, 440, 593, 524/611

[56] References Cited

U.S. PATENT DOCUMENTS

| | | | |
|---|---|---|---|
| 3,441,529 | 4/1969 | Tyler | 524/111 |
| 3,979,218 | 9/1976 | Hesse et al. | 524/6 |
| 4,001,104 | 1/1977 | Vadla et al. | 156/305 |
| 4,915,874 | 4/1990 | Nadkorni et al. | 524/495 |
| 5,002,981 | 3/1991 | Chiu | 523/141 |
| 5,280,063 | 1/1994 | Lewis et al. | 524/495 |

FOREIGN PATENT DOCUMENTS

| | | |
|---|---|---|
| 58-098378 | 6/1983 | Japan . |
| 1-272666 | 10/1989 | Japan . |

*Primary Examiner*—Mark D. Sweet
*Attorney, Agent, or Firm*—Frederick J. McCarthy

[57] ABSTRACT

A room temperature setting carbonaceous cement comprising a solid carbonaceous material, a catalyst, a liquid carbonizable component, and copper particles, which when treated with the catalyst will provide a carbon yield of at least 40% for the liquid component at an elevated baking temperature and possess increased flexural strength at elevated temperatures and reduced electrical resistance.

10 Claims, 4 Drawing Sheets

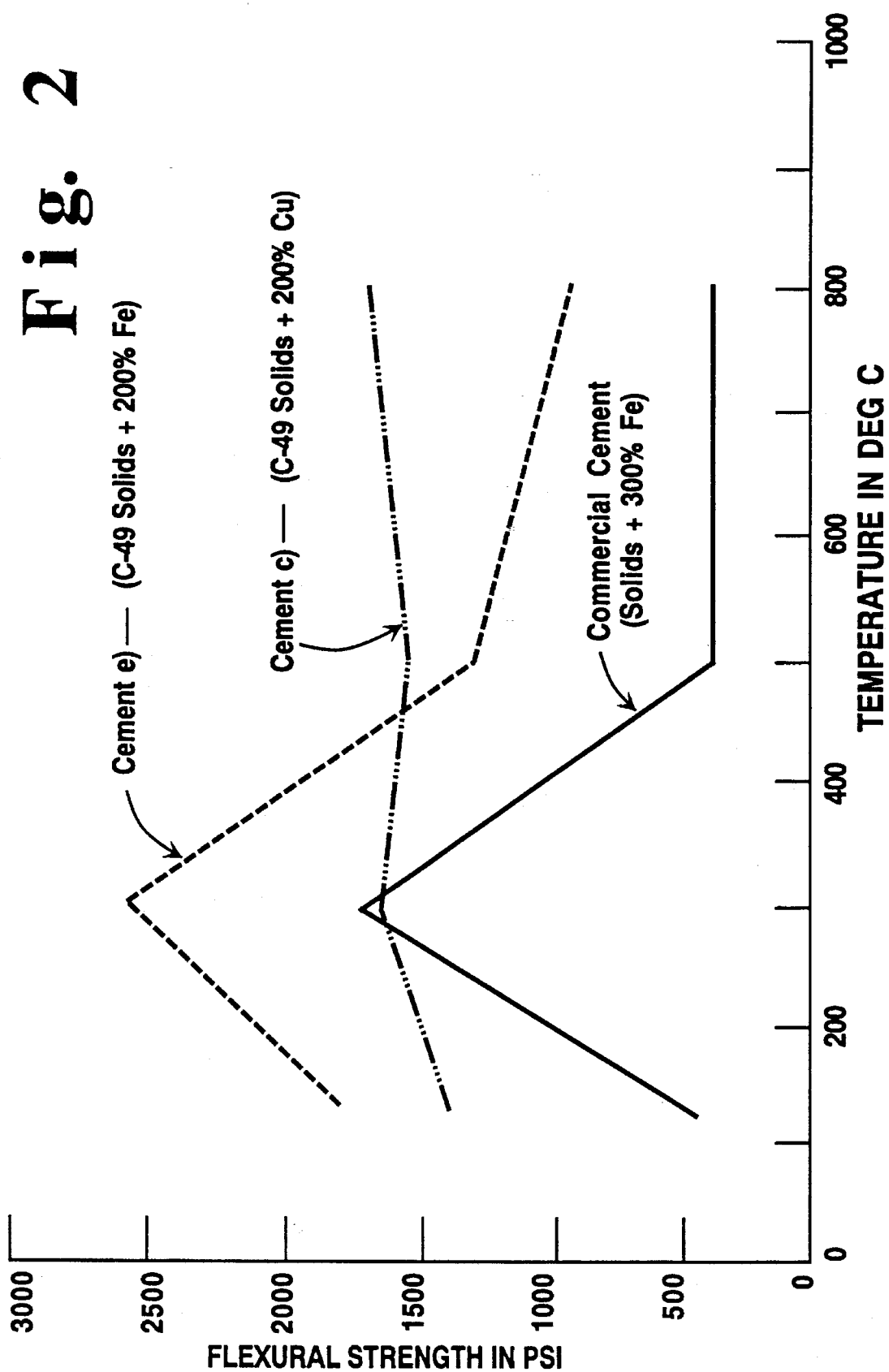

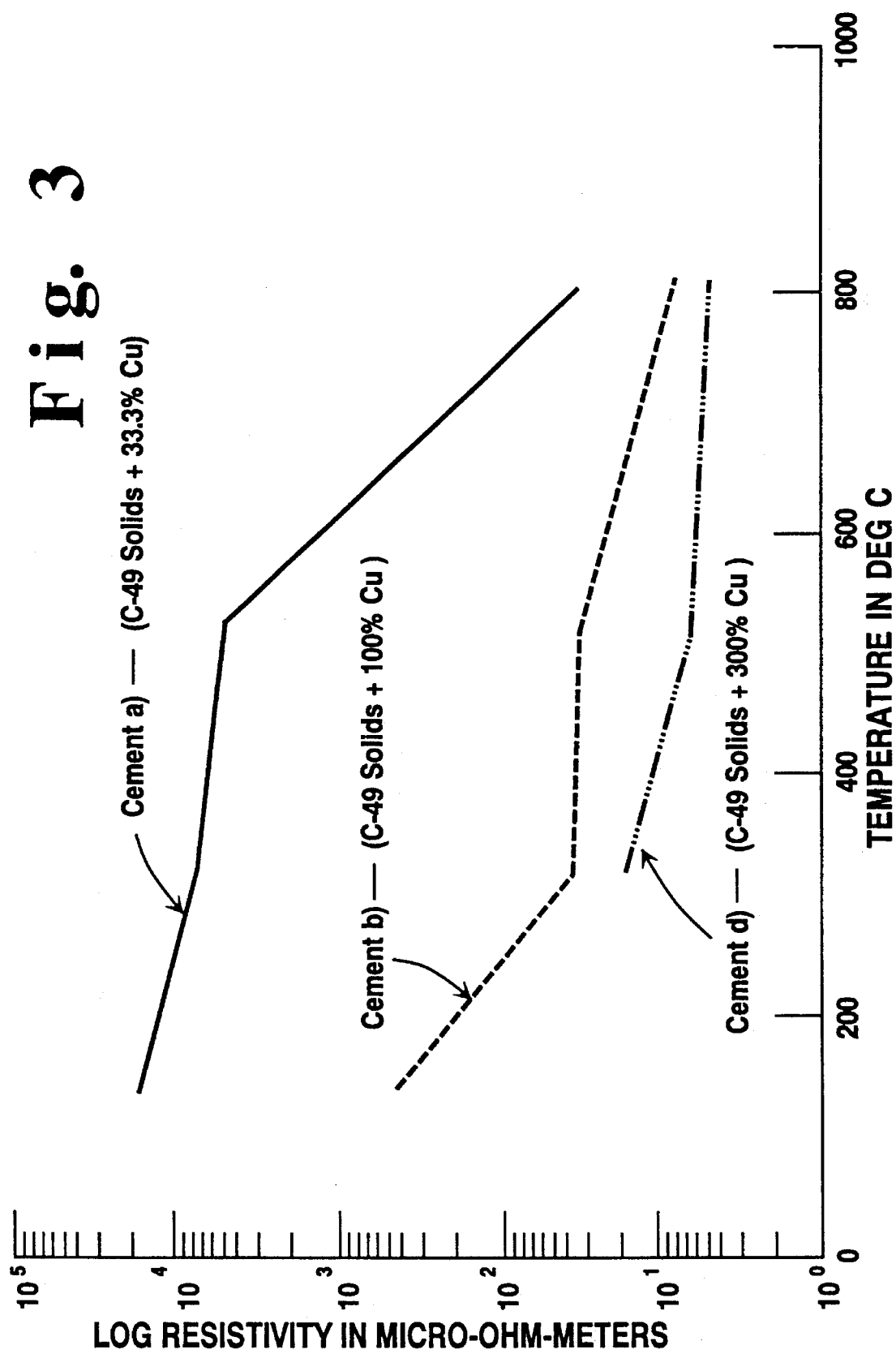

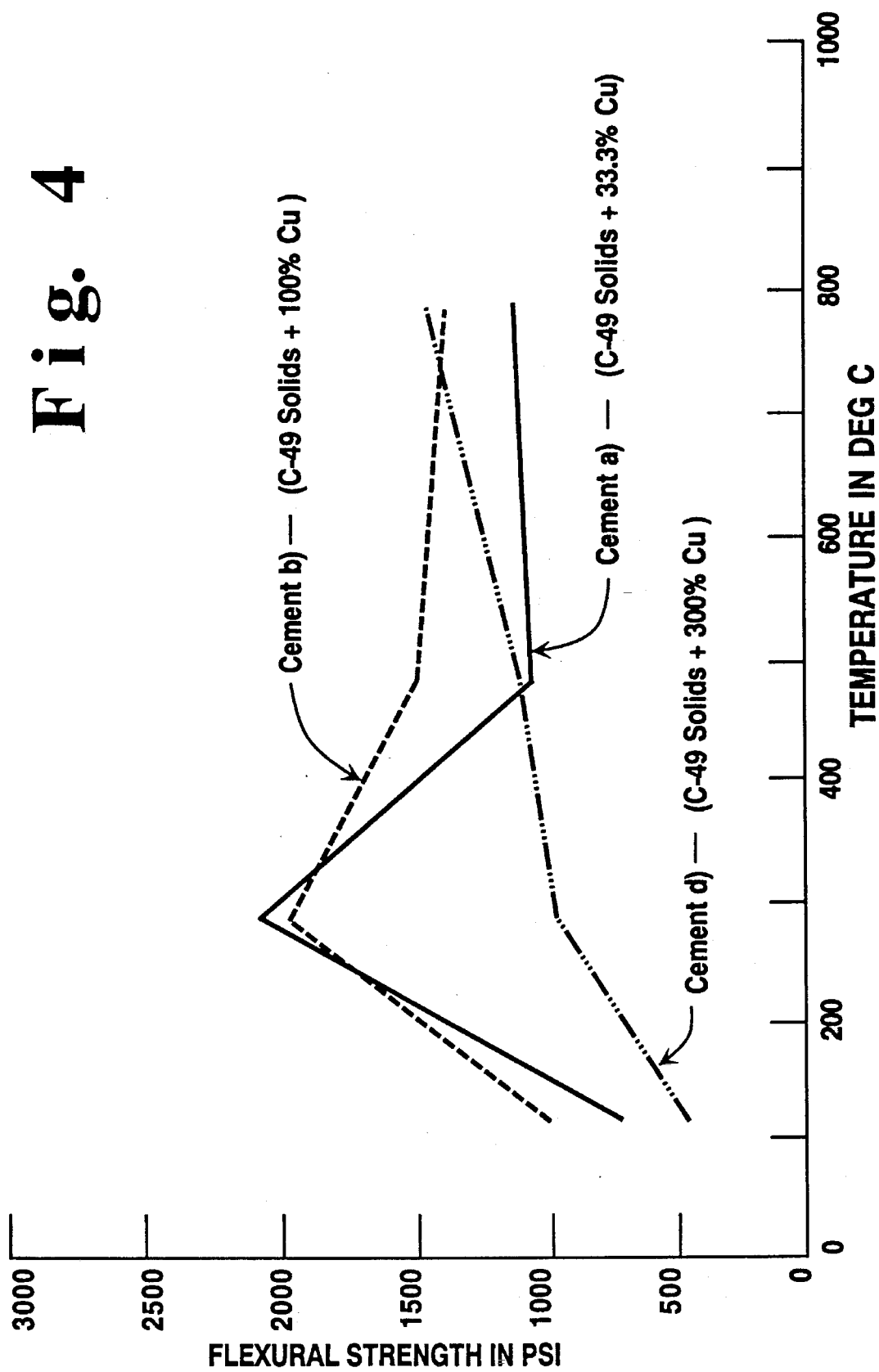

ROOM TEMPERATURE SETTING CARBONACEOUS CEMENT WITH INCREASED ELECTRICAL CONDUCTIVITY AND FLEXURAL STRENGTH

This application is a Continuation of prior U.S. application Ser. No. 08/135,154 filing date Oct. 12, 1993, now abandoned which is a continuation-in-part of application Ser. No. 07/870,314 filing date Apr. 17, 1992, now U.S. Pat. No. 5,280,063.

FIELD OF THE INVENTION

This invention relates to a room temperature setting carbonaceous cement containing copper to improve the electrical conductivity of the cement while retaining the flexural strength of the cement at high temperatures.

BACKGROUND OF THE INVENTION

A carbonaceous cement is composed of an admixture of a carbonaceous material and a thermosetting resin and is conventionally used to bond carbon and graphite structures at elevated temperature. Typically the cement will not set below about 100° C. and will cure and develop a full bond strength at a higher temperature. A carbonaceous cement is currently available from the UCAR Carbon Company, designated as C34 with a composition which is fully described in U.S. Pat. No. 3,441,529. This cement requires heat treatment to 150°–200° C. to achieve setting and full curing and to develop a useful flexural strength of about 2000 psi. The strength is retained on subsequent baking to 850° C. The heat treatment requirement for the C-34 cement presents a substantial practical limitation for use at construction sites where appropriate equipment to heat cemented structures is generally not available. A room temperature setting cement described in Light Metals p. 759 (1991) is also commercially available and currently used by the aluminum industry for cementing collector bars onto cathodes in the production of aluminum. However this cement, which is a three component system, achieves a strength of only about 304 psi after curing and loses most of its strength after baking to 900° C. This cement contains an epoxy resin as the thermosetting liquid, a separate catalyst and a carbon solid. Epoxy resins are known to have limited thermal stability and to give very low carbon yields on baking. It is for this reason that this commercial cement retains very little strength at high baking temperatures. For more general application it is very desirable to have a cement which can set at room temperature and provide adequate strength to permit physical handling without suffering loss in strength after curing and baking. For this purpose it is desirable for the cement to contain a thermosetting resin which can provide a high carbon yield after curing and baking. The minimum strength deemed necessary to satisfy this requirement is an average strength of at least about 500 psi and preferably above 1000 psi. The three component carbonaceous cement which is presently available commercially will set at room temperature but does not provide the minimum strength required at room temperature for more general applications or the ability to retain the minimum strength after curing and baking. It is important in many industrial operations that the cement have high electrical conductivity and high flexural strength at very high operating temperatures. A high electrical conductivity is necessary for use in cementing collector bars or to cement anodes in aluminum refining. For example, iron or steel powder has been added to carbonaceous cements to improve electrical conductivity for collector bar cementing as described in U.S. Pat. No. 4,001,104.

SUMMARY OF THE INVENTION

A carbonaceous thermosetting cement system has been developed in accordance with the present invention which will set at room temperature to provide a rigid cement with an average strength of at least about 750 psi. The setting reaction at room temperature is sufficiently slow that the cement can be applied practically and safely within one to two hours and then develop high strength by further setting at room temperature for up to twenty four hours or longer. This cement increases substantially in strength after full curing at 150° C. and retains a high strength after baking to 850° C.

The carbonaceous cement of the present invention broadly comprises a solid component of a carbonaceous material, a catalyst and a liquid carbonizable component. The solid component preferably comprises an admixture of carbonaceous particles, a phenolic resin and a strong acid catalyst selected from the group consisting of p-toluene sulfonic acid, benzene sulfonic acid, tri-chloroacetic acid, naphthalene disulfonic acid and benzene disulfonic acid. The liquid component is preferably composed of a liquid phenolic dissolved in furfuraldehyde. The catalyst can be provided as a separate third component as either a solid or a solution of the solid. Strong acids which are liquid such as trifluoroacetic acid, sulfuric acid, methane sulfonic acid, phosphoric acid, can be used as catalysts.

The liquid component of the present cement when combined with the catalyst of the solid component provides a very high carbon yield of at least 40–50% on baking, resulting in a retention of strength at high temperature.

Increased electrical conductivity is provided for the cement of the present invention, which is very advantageous in certain applications for aluminum cells, by adding finely divided copper particles to the solid component of the cement. Suitable amounts of copper particles in the total cement of the present invention are from 25% to 300% by weight based on the weight of the solid component, not including copper. In the present invention, copper particles are added to the cement for the purpose of increasing electrical conductivity. However, the copper should be kept separate from the acid catalyst prior to mixing since copper slowly deactivates the catalyst. The copper can be added as a separate component to the two component cement during application. Alternatively, the copper can be incorporated in the solids, if the catalyst is removed and then added separately during application. Essentially the same amount of p-toluenesulfonic acid is required for room temperature setting when copper particles are present in the range of 50 to 150% by weight. For copper levels above 150%, the catalyst should be increased with twice the amount of catalyst being used with a 300% copper addition.

The addition of finely divided copper results in substantial increases in the electrical conductivity of the cement surpassing the effects attained with equivalent amounts of iron. The carbonaceous cement prepared with copper maintains a high flexural strength when baked at high temperatures.

Other advantages of the invention will become apparent from the following detailed description of the invention.

BRIEF DESCRIPTION OF THE DRAWINGS

FIGS. 1 through 4 are graphs showing comparisons of either electrical resistivities or flexural strengths of copper containing cements.

DETAILED DESCRIPTION OF A PREFERRED EMBODIMENT OF THE INVENTION

Figure 1:
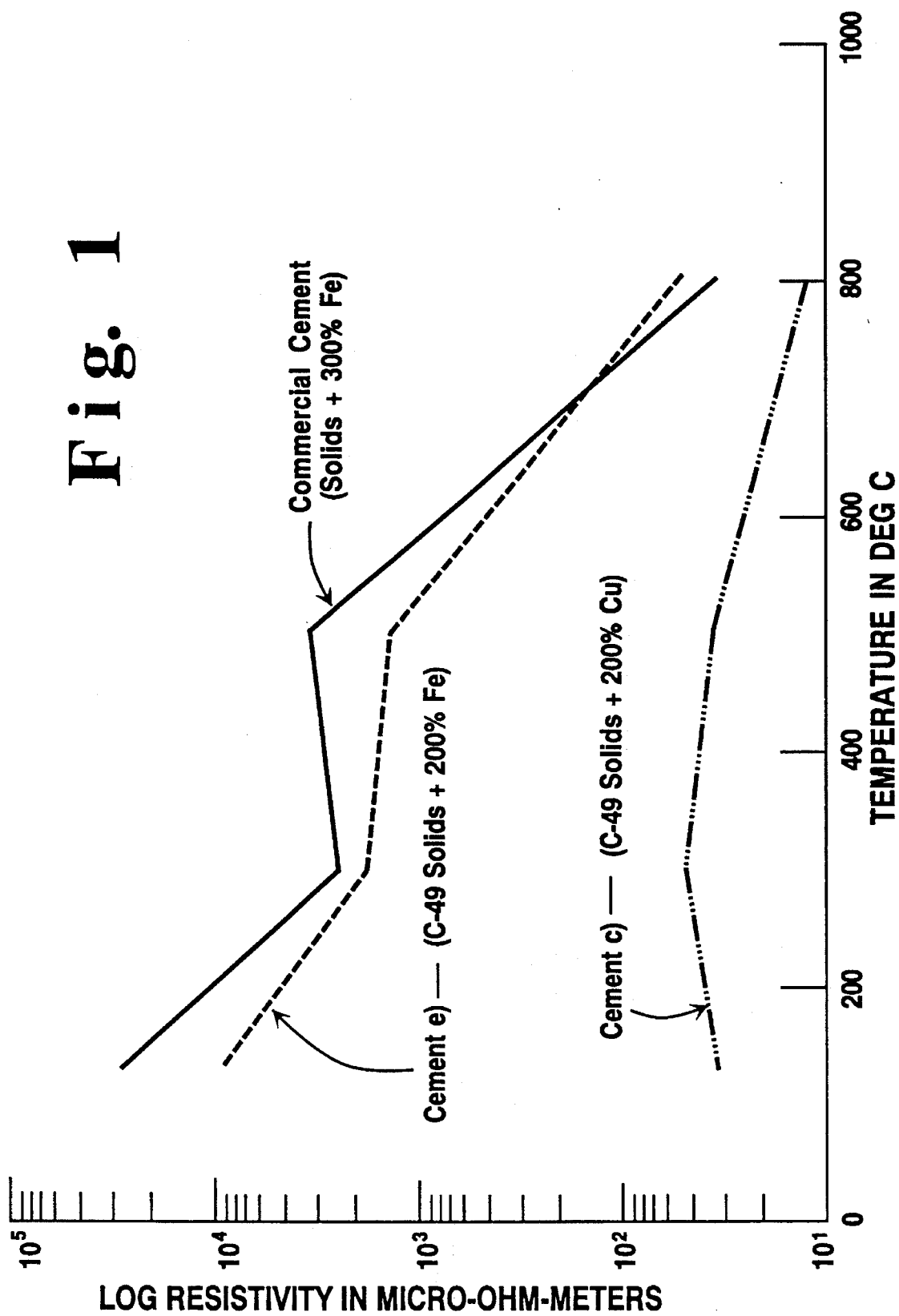

The carbonaceous cement of the present invention prior to the incorporation of copper, may be suitably provided as a two component system although it may be made available as a three component system. The two component system includes a solid portion, and a liquid portion, with the solid portion preferably comprising a mixture of a solid phenolic resin, a suitable carbonaceous material selected from the group consisting of graphite flour, petroleum coke flour, carbon black, pitch coke flour, calcined lampblack flour and the like and a solid acid catalyst. The solid acid catalyst should be selected from the group consisting of p-toluene sulfonic acid, benzene sulfonic acid, tri-chloroacetic acid, naphthalene disulfonic acid, and benzene disulfonic acid. Solutions of these solid acids in solvents, such as water, or strong liquid acids, such as trifluoroacetic acid, sulfuric acid and methanesulfonic acid can be used in a three component cement composition. The solid phenolic resin can be omitted from the solid component but the strength will be reduced.

The liquid portion comprises a solution of a phenolic resin in furfuraldehyde. Any conventional phenolic resin preferably of the resol type, or novolac (without catalyst) can be employed in the solid and/or liquid portion of the carbonaceous cement of the instant invention. However, the phenolic resin should not have any amine or basic catalyst component since this will neutralize the acid catalyst of the cement. The acid catalyst catalyzes the polymerization and carbonization of the furfuraldehyde liquid. The liquid containing the dissolved phenolic resin will give a bake carbon yield of at least 40% when treated with the catalyst of the solid component. The phenolic resin can be removed from the liquid portion and still permit room temperature setting by catalysis of furfural. However the liquid carbon yield will be reduced by about one half and the cured and bake strength will also be reduced.

In the two component system the solid component is preferably composed of carbonaceous particles of graphite powder, carbon black, a solid acid catalyst and a solid phenolic resin. Preferred carbon blacks are gas blacks, which are made by the passage of natural gas over hot refractories. A suitable carbon black is available under the trademark "Thermax" from Cancurb Co., Alberta, Canada. Although preferred, the carbon black component may be omitted from the composition of the solid component. The solid component may also be composed of graphite and Thermax with the phenolic component omitted but the cement strength will be diminished.

The cement may also be formulated as a three component system consisting of a solid component and two liquid components or as two solid components and one liquid component as above described for the two component system with an acid catalyst provided as a separate third component in the form of a fluid solution in water or alcohol.

With the inclusion of copper particles in the cement, the copper can be part of a solids component when the solids component does not contain acid catalyst; in this case a liquid catalyst component is used together with a liquid component comprising a resin solution. When the copper comprises a separately added component, the initial solid component may contain the catalyst, and a single liquid component comprising the resin solution is used.

Suitable amounts of the carbonaceous particles in the total cement of the invention are from about 40 wt % to about 75 wt %, preferably from about 55 wt % to about 65 wt %. When the carbonaceous particles in the solid component are composed of graphite powder and Thermax carbon black, the graphite powder is present in an amount of about 30 wt % to about 50 wt % and the Thermax carbon black is present in an amount of from about 10 wt % to about 30 wt % based upon the weight of the cement. The minimum concentration of catalyst to achieve a room temperature setting will depend upon the selection of the catalyst. When p-toluene sulfonic acid is used as the acid catalyst a room temperature setting can be achieved in less than twenty four hours with as little as about 2.0 weight percent acid catalyst based upon the weight of the cement.

The following examples 1–8 illustrate two and three component cements without copper.

EXAMPLE 1

Three Component Cement (No Copper)

A three component cement consisting of a solid, liquid, and a catalyst was prepared using the following compositions:

| | | |
|---|---|---|
| Solid: | Graphite Flour | 70 g |
| | (Thermax) Carbon Black | 30 g |
| | Phenolic Resin | 20 g |
| Liquid: | 50% by Volume Resol Phenolic Resin in Furfuraldehyde | 40 g |
| Catalyst: | 75/25 by Weight p-Toluene Sulfonic Acid in Water | 5 g |

The graphite flour is milled graphite which at least 60% passes through a 200-mesh screen.

The three components were thoroughly mixed and then used to cement two pieces of isotropic UCAR Grade ATJ graphite. The cemented graphite pieces were tested after sitting at room temperature for six days and the cement bond strength was measured as 1260 psi.

A second set of cemented pieces was cured to fully cross-link the cement bond by heating at 140° C. for one hour. The cured cemented pieces were then tested for bond strength and the graphite specimens broke at a strength value of 3000 psi while the joint was still intact. The joint strength therefore exceeded 3000 psi.

A third set of cemented samples was also cured at 140° C., baked to 850° C., and then tested for strength. The strength value after baking was measured at 1780 psi.

EXAMPLE 2

Two Component Cement (No Copper)

A two component cement was prepared with only a solid and a liquid component. The cement had the following compositions:

| | | |
|---|---|---|
| Solid: | Graphite Flour | 70 g |
| | (Thermax) Carbon Black | 30 g |
| | Phenolic Resin | 20 g |
| | p-Toluene Sulfonic Acid Monohydrate | 3.75 g |
| Liquid: | 50% by Volume Resol Phenolic Resin in Furfuraldehyde | 40 g |

The cementing and testing was carried out identically to Example 1. The strength after room temperature setting for about 6 days was 1180 psi. The bonded piece after curing developed a strength greater than 3000 psi since the graphite rather than the cemented bond broke after testing. Cemented pieces tested after being baked to 850° C. gave strength values of 1620 psi. The solid components with PTSA catalyst were stored for three months at room temperature without altering the bonding properties of the cement.

EXAMPLE 3

Two Component Cement (No Copper)

The cement of Example 2 was tested after setting at room temperature for 24 hours. The cement had completely solidified showing it had set and the flexural strength was measured as 620 psi. After curing at 140° C. for one hour the flexural strength exceeded 3000 psi. A sample that was baked to 850° C. had a strength of 1600 psi.

EXAMPLE 4

Increase of Liquid Content (No Copper)

The cement of Example 2 was prepared using twice the amount of liquid to provide a cement with a lower viscosity. The composition of this cement was:

|  |  | Weight | Wt % |
|---|---|---|---|
| (Solids and Catalyst) | Graphite Flour | 70.0 g | 34.35 |
|  | (Thermax) Carbon Black | 30.0 g | 14.73 |
|  | Phenolic Resin | 20.0 g | 9.82 |
|  | p-Toluene Sulfonic Acid Monohydrate | 3.75 g | 1.84 |
| Liquid: | 50% by Volume Resol Phenolic Resin in Furfuraldehyde | 80.0 g | 39.26 |

After 24 hours at room temperature, this cement was fully set showing that the catalyst level was sufficient.

EXAMPLE 5

Decrease of Catalyst Content (No Copper)

The cement of Example 4 was repeated except that the p-toluene sulfonic acid catalyst level was reduced by 50% to 1,875 grams. After 96 hours at room temperature, the cement was still fluid indicating it had not fully set.

|  |  | Weight | Wt % |
|---|---|---|---|
| (Solids and Catalyst) | Graphite Flour | 70.0 g | 34.67 |
|  | (Thermax) Carbon Black | 30.0 g | 14.86 |
|  | Phenolic Resin | 20.0 g | 9.91 |
|  | p-Toluene Sulfonic Acid Monohydrate | 1.875 g | 0.93 |
| Liquid: | 50% by Volume Resol Phenolic Resin in Furfuraldehyde | 80.0 g | 39.63 |

EXAMPLE 6

High Conductivity Carbonaceous Cement (Iron Addition)

In order to increase the electrical conductivity, a cement similar to that in Example 2 was prepared except that steel filings were added to increase the electrical conductivity. The cement had the following composition:

|  |  | Weight |
|---|---|---|
| Solids: | Graphite Flour | 70.0 g |
|  | (Thermax) Carbon Flour | 30.0 g |
|  | Phenolic Resin | 20.0 g |
|  | p-Toluene Sulfonic Acid Monohydrate | 11.25 g |
|  | Steel Filings | 80.0 g |
| Liquid: | 50% by Volume Resol Phenolic Resin in Furfuraldehyde | 50.0 g |

This cement was set after sitting at room temperature for 24 hours. A higher catalyst level had to be used to obtain room temperature setting with the added steel filings.

EXAMPLE 7

Removal of Phenolic from Liquid Component (No Copper)

(a) A cement was prepared similar to Example 1, except that the liquid component contained furfuraldehyde without any added phenolic resin. A small amount of Polyox, a trademark product of Union Carbide Corporation for a water soluble polyethyleneoxide resin, was added as a thickener. The cement had the following composition:

| Solids: | Graphite Flour | 17.5 gms |
|---|---|---|
|  | (Thermax) Carbon Black | 7.5 gms |
|  | Phenolic Resin | 5.0 gms |
| Liquid: | Furfuraldehyde | 9.9 gms |
|  | Polyox | 0.2 gms |
| Catalyst: | 75% p-Toluene Sulfonic Acid in Water | 2.5 gms |

This material appeared to set to a solid at room temperature after about 24 hours. The cement was completely cured by heating to 200° C. in argon for two hours. The cure yield was 89.8%. The cement was then baked by heating to 800° C. in an inert atmosphere and held at 800° C. for one hour. The bake carbon yield was 86.5% giving an overall yield of 77.7% (89.8×0.865).

(b) For comparison a cement similar to Example 1 was prepared with the following composition:

| Solids: | Graphite Flour | 17.5 gms |
|---|---|---|
|  | (Thermax) Carbon Black | 7.5 gms |
|  | Phenolic Resin | 5.0 gms |
| Liquid: | Furfuraldehyde | 5.0 gms |
|  | Phenolic Resin | 5.0 gms |
| Catalyst: | 75% by Weight p-Toluene Sulfonic Acid in Water | 1.3 gms |

This cement gave a cure yield of 98.0%, a bake yield of 82.8% and an overall yield of 81.1%. The lower carbon yield of the example of (7a) would be expected to lead to reduced strength.

EXAMPLE 8

Removal of Phenolic Resin from the Solid Portion (No Copper)

A cement similar to Example 1 was prepared except that there was no phenolic resin in the solids. The composition follows:

| Solids: | Graphite Flour | 20.0 gms |
|---|---|---|
|  | (Thermax) Carbon Black | 9.0 gms |
| Liquid: | Furfuraldehyde | 5.0 gms |
|  | Phenolic (Resol) | 5.0 gms |
| Catalyst: | 75% by Weight p-Toluene Sulfonic Acid in Water | 1.26 gms |

After sitting at room temperature for 24 hours, the cement had solidified.

The cement was fully cured by holding at 200° C. in an argon atmosphere for two hours and gave a cure yield of 90.7%. However, the cured cements were porous and had a poorer structure than the baked cements of Examples 1 and 2.

A conductive cement was prepared in Example 6 using steel filings to increase electrical conductivity. The iron partially deactivated the PTSA catalyst and a high catalyst level was required in order to achieve room temperature setting. The PTSA catalyst level used was 11.25 gm per 50 gm of liquid or 22.5% by weight. In comparison, a similar cement prepared without iron (Example 2) required 9.9% by weight of catalyst per liquid to achieve room temperature setting. High catalyst levels raise the cost of the cement, make thermosetting control more stringent and may lead to reduction in final cement strength.

With the use of copper rather than iron, increased electrical conductivity is achieved and high strength and room temperature setting are also achieved using low catalyst levels. The copper is added as fine powder or particles. The particle size of the copper should be about the same as, or less than that of the graphite powder of the following examples (<200 μm). The greater the amount of copper, the higher the electrical conductivity. A useful range is 25–300% by weight of copper based on the weight of the solid component without copper.

EXAMPLE 9

High Conductivity Carbonaceous Cement (Copper Addition)

In order to increase the electrical conductivity, a cement similar to that in Example 2 was prepared except that copper filings were added to increase the electrical conductivity. The cement had the following composition:

|  |  | Weight |
| --- | --- | --- |
| Solids: | Graphite Flour | 28.3 g |
|  | Thermax | 12.1 g |
|  | Phenolic Resin | 8.1 g |
|  | p-Toluene Sulfonic Acid Monohydrate | 1.5 g |
| Liquid: | 50% Resol Phenolic by Volume in Furfuraldehyde | 33.3 g |
| Conductor: | Copper Filings | 50.0 g |

After baking at 800° C., the resistance of the conductive cement was compared to the room temperature cement without copper filings. The following resistance measurements were made:

| Cement (No Copper Filings) | 41 Micro-Ohm-Meter |
| --- | --- |
| Cement (With Copper Filings) | 4 Micro-Ohm-Meter |

The resistance measurements were obtained using ASTM Test Method C611 on the nominal one inch square by five inch length cast cement bars.

EXAMPLE 10

Copper Additions and Iron Addition

Cement samples were prepared using various amounts of copper in order to determine the effect on electrical conductivity and flexural strength. A cement solid component (identified as C-49 solids) was prepared using the following composition:

| C-49 Solids: | Graphite Flour | 112 gms |
| --- | --- | --- |
|  | Thermax (Carbon Black) | 48 gms |
|  | Phenolic Resin | 37 gms |
|  | p-Toluene Sulfonic Acid | 7 gms |

Blends were then prepared by adding to the mixed solids: 33.5%, 100%, 200%, and 300% by weight of fine copper powder (50 μm). The mix compositions are shown below:

(a) 200 gms C-49 cement solids+67 gms copper (solids+ 33.3% Cu);

(b) 200 gms C-49 cement solids+200 gms copper (solids+ 100% Cu);

(c) 200 gms C-49 cement solids+400 gms copper (solids+ 200% Cu);

(d) 200 gms C-49 cement solids+600 gms copper (solids+ 300% Cu);

A blend containing iron was also prepared by mixing 200% wt. % iron.

(e) 200 gms C-49 cement solids+400 gms iron (solids+ 200% Fe).

The solid copper and iron containing cement powders were then mixed with liquid composed of 50% resol phenolic in furfural. For blend (a), 80 gms of liquid was used while the liquid level was adjusted for the higher metal containing powders to achieve the same consistency as blend (a).

The mix cements were then molded into 1"×1"×5" bars and heated to 130°, 300°, 500°, and 800° C. The heat treated bars were then evaluated for electrical resistivity and flexural strength.

The results are summarized in Table I and in the graphs of the drawings. The copper containing cements are significantly higher in electrical conductivity, i.e. decreased resistivity than the cement prepared by addition of equivalent amounts by weight of iron (e) or a commercial iron containing cement plotted in the figure. The copper containing cement also exhibited substantially higher flexural strength than the iron containing cement after baking to 800° C. Both the high conductivity and high strength are particularly advantageous for using this cement in aluminum applications such as in cementing collector bars. The conductivity of the copper containing cement is about ten times greater than cement without copper.

With the cement of the present invention, a room temperature flexural strength at 800° C. above 1000 psi is achieved with an electrical resistivity of not more than 80 micro-ohm-meters.

TABLE I

|  | Resistivity in μ Ω m (°C.) | | | | Flex. Strength in psi (°C.) | | | |
| --- | --- | --- | --- | --- | --- | --- | --- | --- |
|  | 130° | 300° | 500° | 800° | 130° | 300° | 500° | 800° |
| e) C49 Solids + 200 Wt. % Fe | 9000 | 2000 | 1500 | 80 | 1800 | 2700 | 1250 | 1000 |
| c) C49 Solids + 200 Wt. % Cu | 30 | 50 | 40 | 18 | 1400 | 1600 | 1500 | 1650 |
| a) C49 Solids + 33.3 Wt. % Cu | 20000 | 9000 | 6000 | 80 | 750 | 2200 | 1000 | 1150 |
| b) C49 Solids + 100 Wt. % Cu | 400 | 500 | 50 | 20 | 1000 | 2000 | 1600 | 1350 |
| d) C49 Solids + 300 Wt. % Cu | — | 20 | 10 | 10 | 400 | 1000 | 1050 | 1500 |

What is claimed is:

1. A three component carbonaceous cement which will set at room temperature and is capable of being applied to a carbon surface within two hours of mixing of the three components without undergoing a significant viscosity increase and sets to a solid shape within 24 hours said cement consisting of a first solid component, a second liquid component and a third component containing an acid polymerization catalyst in an amount sufficient to effect setting of the cement at room temperature, said first solid component comprising an admixture of carbonaceous particles, copper particles, and a solid phenolic resin, said second liquid component comprising an amine-free and basic catalyst-free solution of a liquid resol phenolic dissolved in an acid polymerizable furfuraldehyde solvent and wherein said polymerization catalyst in said third component consists of a strong acid selected from the group consisting of p-toluene sulfonic acid, benzene sulfonic acid, trichloroacetic acid, naphthalene disulfonic acid, benzene disulfonic acid, trifluoroacetic acid, sulfuric acid and methanesulfonic acid dissolved in water or alcohol and wherein the concentration of the copper is from 25% to 300% by weight of the first solid component not including copper.

2. A three component carbonaceous cement in accordance with claim 1 wherein said cement is characterized by a carbon yield of at least 40% at an elevated baking temperature up to and above 800° C., a flexural strength of above at least 1000 psi at room temperature and at said elevated baking temperature and a resistivity at 800° C. of not more than about 80 micro-ohm-meters.

3. A room temperature setting cement as claimed in claim 2 wherein said carbonaceous material is selected from the group consisting of graphite flour, petroleum coke flour, carbon black, pitch coke flour and calcined lampblack flour.

4. A room temperature setting cement as claimed in claim 3 wherein said catalyst is an acid catalyst selected from the group consisting of p-toluene sulfonic acid, benzene sulfonic acid, trichloroacetic acid, naphthalene disulfonic acid, benzene disulfonic acid, trifluoroacetic acid, sulfuric acid and methanesulfonic acid.

5. A room temperature setting cement as claimed in claim 4 wherein said carbonizable liquid comprises furfuraldehyde.

6. A room temperature setting cement as claimed in claim 5 wherein said carbonizable liquid further comprises a phenolic resol resin dissolved in said furfuraldehyde.

7. A room temperature setting cement as defined in claim 1 wherein the concentration of said carbonaceous particles are from 40 wt % to about 75 wt % based on the weight of the cement.

8. A room temperature setting cement as defined in claim 7 wherein said carbonaceous particles are composed of graphite powder and carbon black.

9. A room temperature setting cement as defined in claim 8 wherein the graphite powder is present in an amount of from 30 wt % to about 50 wt % and the carbon black is present in an amount of from about 10 wt % to about 30 wt % based on the weight of the cement.

10. A room temperature setting cement as defined in claim 9 wherein said catalyst comprises p-toluene sulfonic acid and with the flexural strength of the cement at 800° C. being above 1000 psi.

* * * * *